(No Model.)
J. C. HENRY.
LOCATING FAULTS IN ELECTRIC RAILWAYS.
No. 540,054. Patented May 28, 1895.
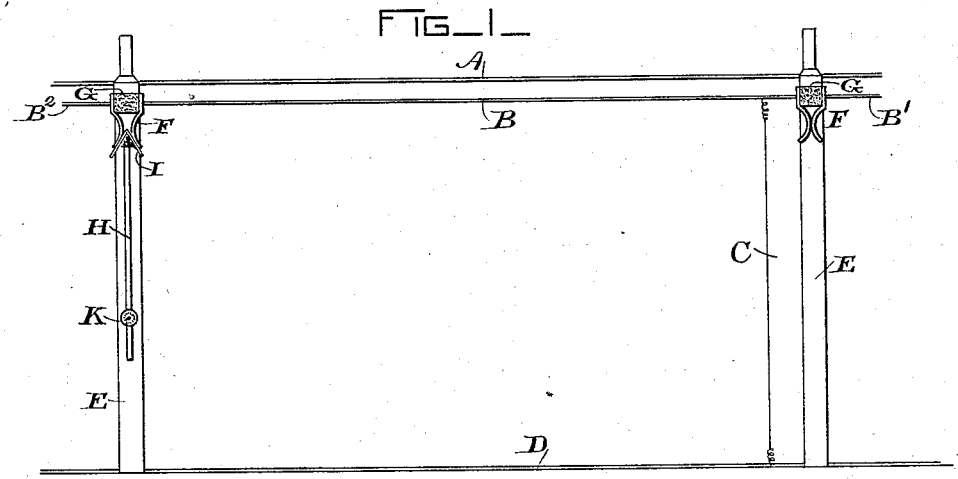
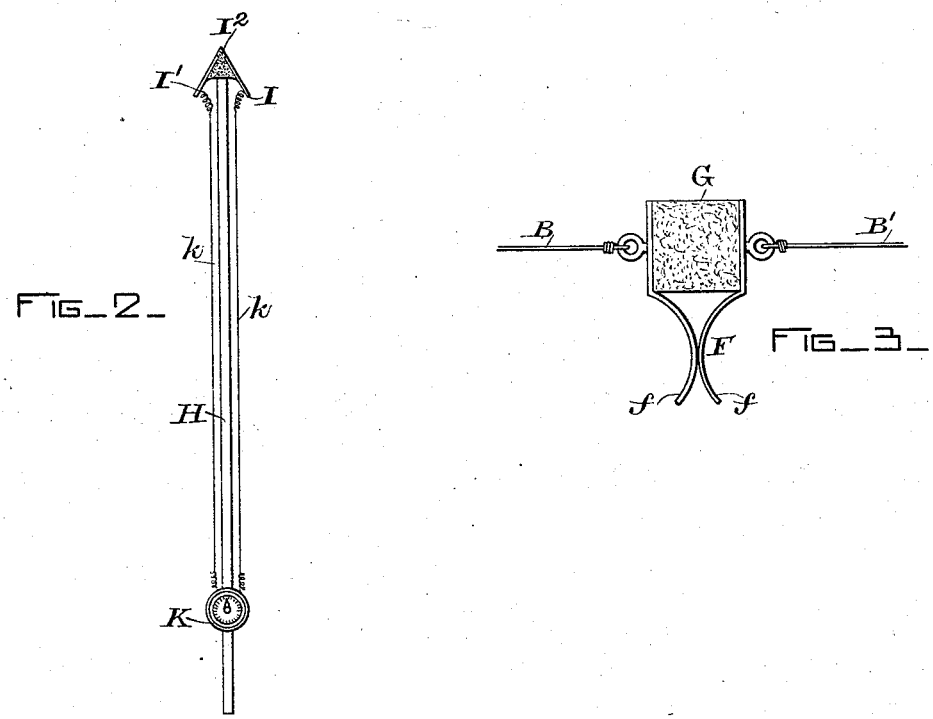
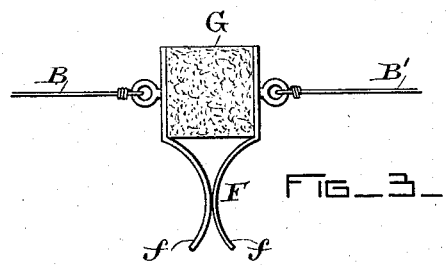
WITNESSES
INVENTOR

UNITED STATES PATENT OFFICE.

JOHN C. HENRY, OF WESTFIELD, NEW JERSEY.

LOCATING FAULTS IN ELECTRIC RAILWAYS.

SPECIFICATION forming part of Letters Patent No. 540,054, dated May 28, 1895.

Application filed January 24, 1894. Serial No. 497,843. (No model.)

*To all whom it may concern:*

Be it known that I, JOHN C. HENRY, a citizen of the United States, residing at Westfield, county of Union, State of New Jersey, have invented certain new and useful Improvements in Locating Faults in Electric Railways, of which the following is a specification.

My invention relates to apparatus for locating faults in electric railways, and has for its object to provide a convenient method of measuring the resistance of the ground return or track circuit by convenient standard instruments of well known construction, by which I am enabled to locate, to a very close approximation, a fault in the track circuit, so that the work of repair may be minimized, and the existence of a fault may be determined as promptly as possible.

It is well known that in electric railways as ordinarily constructed, a fault in the track must be searched for between the points at which the feeders enter the circuit, and the only methods heretofore existing have been by the use of special testing instruments, more or less expensive in construction, or by exploration involving, in the case of electric tramways in cities, more or less disturbance of the street surface, and consequent interruption of travel. These methods were objectionable on this account and further objectionable inasmuch as it was practically impossible to know the state of the entire track at any time by reason of the length of time necessary for effecting the various tests. It is to supercede these methods and to provide a means so convenient that the entire track may be readily tested every day, if desired, that I have devised my present invention, which consists briefly in providing a supplemental return conductor divided into sections connected preferably by spring switches, each of the sections connected to the track and so located and arranged that an ammeter may be inserted between them or between the supplemental conductor and its connection with the track, to measure the current. As ordinarily arranged, the main current returns by the track and the ordinary buried return conductor connected thereto for the purpose of lowering the resistance. The supplemental conductor to which I have referred is of comparatively high resistance. It however serves ordinarily to convey only a small percentage of the current back to the power house. Upon the occurrence of a fault in the track return, however, the current, instead of passing over the defective spot, will seek another path through the high resistance conductor, the resistance of which for so short a distance would necessarily be much less than that of any serious fault in the track return; while beyond the fault the current would again flow mainly in the track circuit, the supplemental conductor thus forming a shunt around the fault, while not interfering with the ordinary function of the track and its buried return as a conductor. The section of the supplemental conductor serving a shunt will carry a very much greater current around the fault than the other sections of the supplemental conductor wherein the resistance acts to cut down the current and confine it to the track. Thus ammeters inserted between the sections or in the branch conductor will show a greater current passing in one section than in another and will locate the fault, which may be speedily repaired. Ordinarily means for inserting an ammeter may be placed upon each pole or in each man hole, where the conductor is carried in a conduit; but in case of tramways in open country wherein the whole track structure is exposed to view, these switches which I prefer to employ may be located at greater distances apart. To enable me to take readings more rapidly than ordinarily I arrange the ammeter upon a pole and have its terminals upon the end of the pole connected by wires to the ammeter, and thus the operator may walk along from one pole of the road to another, and by inserting the ammeter terminals between the parts of the spring jack or switch, may take the readings rapidly and accurately, while at the same time the spring jacks or switches will be located so far above ground that they will be out of the reach of curious or mischievous interference.

In the accompanying drawings, hereby referred to and made part of this specification, like letters refer to like parts throughout.

Figure 1 is a diagram showing a system to which my improved method is applied. Fig. 2 illustrates the pole carrying the ammeter and its terminals, and Fig. 3 is an enlarged iew of one of the spring-jacks which I prefer to use with a supplemental return-conductor connected thereto.

The structure embodying the preferred return conductor is illustrated and described in my Patent No. 508,615, dated November 14, 1893, and its electric functions other than those used in testing the line are therein referred to and claimed.

Referring by letter, A is the trolley line.

B, B', B² are the sections of my supplemental return conductor.

C is a branch connection to the track.

D is the track circuit.

E, E are posts carrying the overhead structure.

F, F are the spring jacks or switches referred to. In Fig. 3 their construction is shown enlarged and therein G is a body of insulating material. $f, f$ are the blades of the spring jack which, as illustrated, ordinarily make contact and complete the circuit around the insulating material G. For this insulating material may be substituted, if desired, a high resistance conductor such as plates of iron in contact or carbon around which the spring jack F would act as a shunt.

Referring now to Fig. 2, H is a pole or staff. K is an ammeter affixed thereto and connected by the wires $k, k$, with the terminals I, I'. These terminals are arranged in the shape of an arrow head or V, so as to readily separate the blades $f, f$ of the spring jack when inserted between them, as illustrated in the left hand portion of Fig. 1. I² is a block of insulating material between the terminals I, I'. For this block however air insulation may be substituted, if desired, and the terminals may be affixed directly to the wooden part of the pole.

The use and operation of the device will be readily understood from the statement of invention herewith.

I do not mean to limit myself to the precise construction shown, though I believe this to have distinct advantages, as any of the ordinary devices known in the art for inserting measuring instruments may be employed in the place of the spring jacks; but I believe myself to be the first to locate faults by measuring the resistance or current flow in the track return and the first to devise means to make such measurements rapidly and accurately.

While I prefer a track return with the ordinary buried conductor, it is manifest that the supplemental return conductor illustrated in my patent before referred to may be used independently of such buried conductor as a means of testing in the manner herein pointed out, and may be located in any convenient position on poles or in a conduit.

It is manifest that the method herein pointed out of testing faults may be applied to the testing of the resistance of a track return, so as to adapt the plant to the best conditions of working, in ways well understood among electrical engineers. The supplemental conductor may be located in a conduit parallel with the tracks instead of on poles, as shown.

Where the current varies on the line, absolute measurements are obtained by the insertion of ammeters at two points which are on opposite sides of one of the branch conductors. By reading the indications simultaneously, faults in the track connections are disclosed by the discrepancy shown in the ammeters. Portable supplemental conductors may be used without departing from the spirit of my invention.

What I claim as new, and desire to secure by Letters Patent of the United States, is—

1. In combination, a supplemental return conductor for an electric railway connected at intervals to the track or ground return and divided into sections normally connected together, and means adapted to measure the current flow between the sections.

2. In combination, a high resistance supplemental return conductor for an electric railway, connected at intervals to the track or ground return and divided into sections normally connected together, and means adapted to measure the current flow between the sections.

3. In combination, a supplemental return conductor for an electric railway connected at intervals to the track or ground return, such conductor being divided into sections by spring jacks normally completing the circuit, and a testing instrument provided with terminals adapted to co-operate with the switches and cause the circuit between the two conductors to be completed through the instrument.

4. In an electric railway, in combination, a track return, a supplemental return conductor divided into sections, a switch composed of insulating material connecting the sections of the conductor together mechanically, and spring blades completing the electrical connection of the conductor sections around such insulating material, an ammeter arranged upon a staff and having terminals adapted to separate the blades of the switch and complete the circuit between the sections of the conductor through the ammeter.

5. In an electric railway, a track return, a sectional conductor disposed upon the poles of the road out of reach of the passers-by, switches connecting the sections of the conductor at or near the top of the poles, an ammeter carried upon a staff and having terminals upon the end of such staff connected to the ammeter and adapted to register with the switches to complete the circuit through the ammeter.

In witness whereof I have hereunto set my hand this 22d day of January, 1894.

JOHN C. HENRY.

Witnesses:
M. V. BIDGOOD,
HARRY E. KNIGHT.